Figure 1:
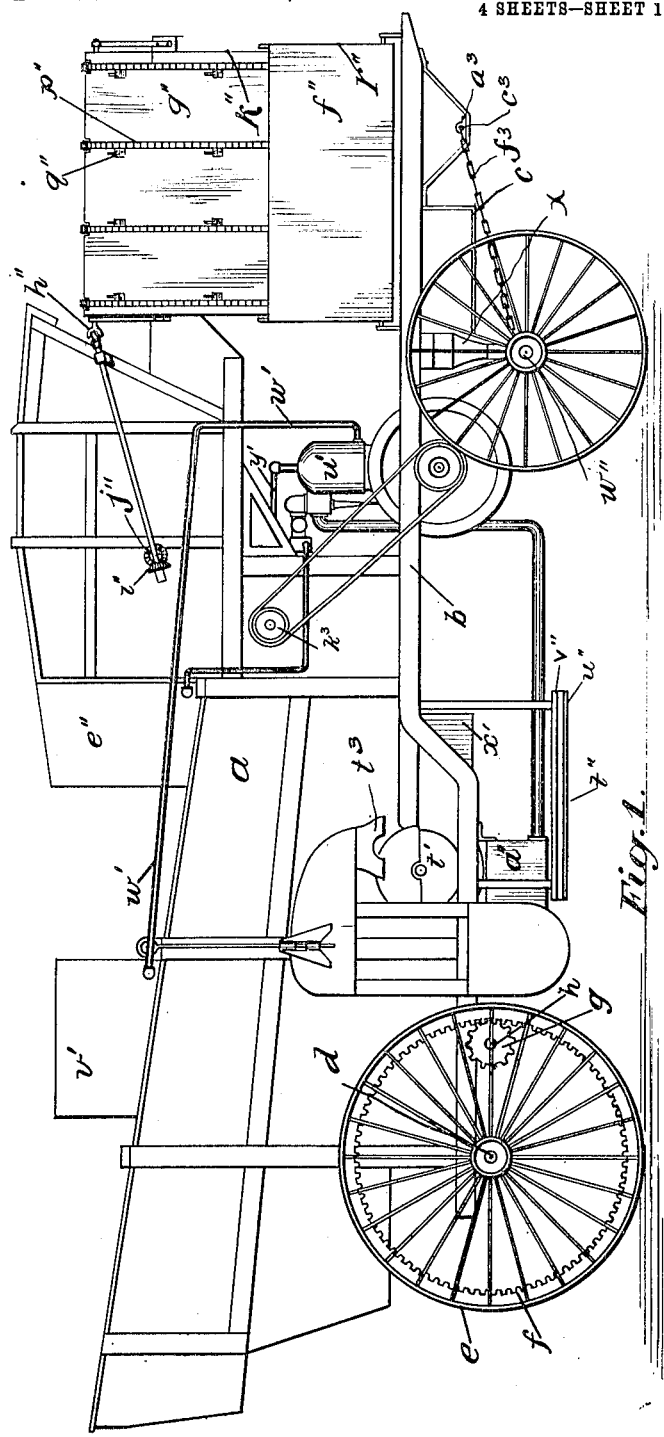

No. 844,627. PATENTED FEB. 19, 1907.
R. SYLVESTER.
THRESHING MACHINE.
APPLICATION FILED OCT. 14, 1904.

4 SHEETS—SHEET 1.

Witnesses.
L. C. Hurlburt
H. L. Trimble.

Inventor:
Richard Sylvester
by Chas W Beches
his attorney

Witnesses.
L. C. Hurlbuch
H. L. Trimble

Inventor.
Richard Sylvester
by Chas Brooks
his attorney

UNITED STATES PATENT OFFICE.

RICHARD SYLVESTER, OF LINDSAY, ONTARIO, CANADA.

THRESHING-MACHINE.

No. 844,627.  Specification of Letters Patent.  Patented Feb. 19, 1907.

Application filed October 14, 1904. Serial No. 228,466.

*To all whom it may concern:*

Be it known that I, RICHARD SYLVESTER, of the town of Lindsay, in the county of Victoria, Province of Ontario, Canada, have invented certain new and useful Improvements in Threshing-Machines; and I hereby declare that the following is a full, clear, and exact description of the same.

The objects of this invention are, first, to combine with the separating mechanism of a threshing-machine a motor, preferably of the calorific class, in which steam, gas, coal-oil, wood-alcohol, or gasolene is used as the motive agent, and to simultaneously translate from the motor to the traction-wheels and to the separating mechanism, or to either of them independently of the other, by suitable transmitting means the driving motion of the motor; second, to dry the grain as it passes through the separating mechanism by an induced air-current created by the action of the fan or blower revolving in the fan-cylinder and heated by its contact with the motor and radiator as it circulates toward the air-inlet of the separator and by its contact with the casing of the fan-cylinder heated by direct radiation from the heater.

In carrying out the first of these objects the threshing-machine is equipped with steering and driving wheels, the latter of which are driven by a suitable gearing from the motor, which is preferably mounted upon or suspended from the middle of the threshing-machine frame in front of the fan or blower in such a manner that the minimum of lightness and compactness may be combined with the maximum of power and speed without interfering with or impairing the strength or action of any of the operating parts of the threshing apparatus, and to transmit the driving motion by a suitable arrangement of belts or gearing from the same motor to the driven parts of the separating mechanism, the gearing for translating the driving motion of the motor to the driving-wheels and to the driven parts of the separating mechanism being arranged to be thrown into and out of action by suitable controlling means.

In carrying out the second object of the invention the motor and the radiator or coils of pipes employed for cooling the water circulating from the water-tank through the water-jacket of the motor are placed in front of the fan or blower, so that the air-current induced or created by the revolution of the fan must circulate around and through them and by its contact with them become heated as it passes to the air-inlet of the separating mechanism, through which it is drawn by the suction created by the revolution of the fan, so that when the grain is delivered from the separating mechanism it will be for all practical purposes in a perfectly dry condition irrespective of the condition of the sheaf when it enters the cylinder of the separator, the degree of dryness depending entirely upon the temperature of the air-current and the speed at which the grain is passing over the screens or sieves.

For a full understanding of the invention reference is to be had to the following description and to the accompanying drawings, in which—

Figure 2:
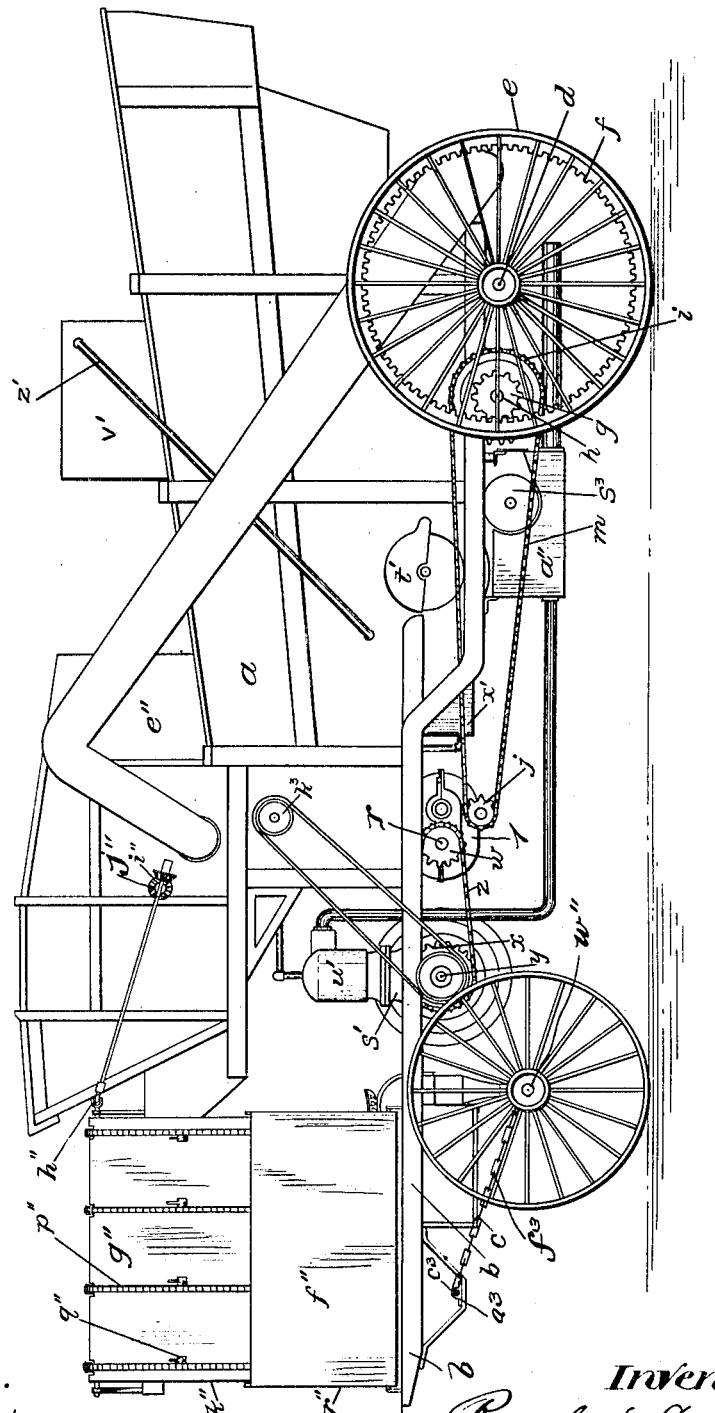
Figure 3:
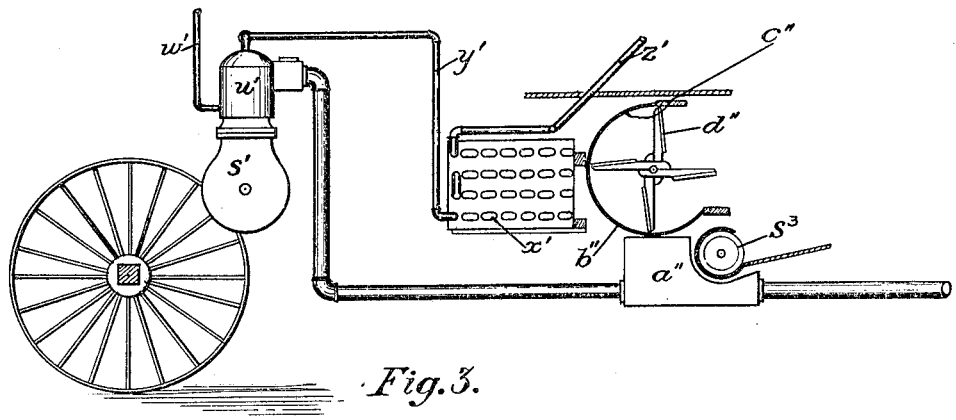
Figure 4:
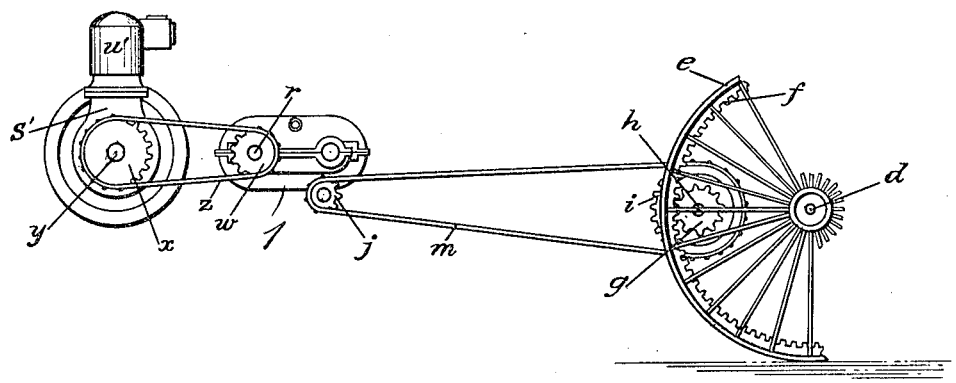
Figure 5:
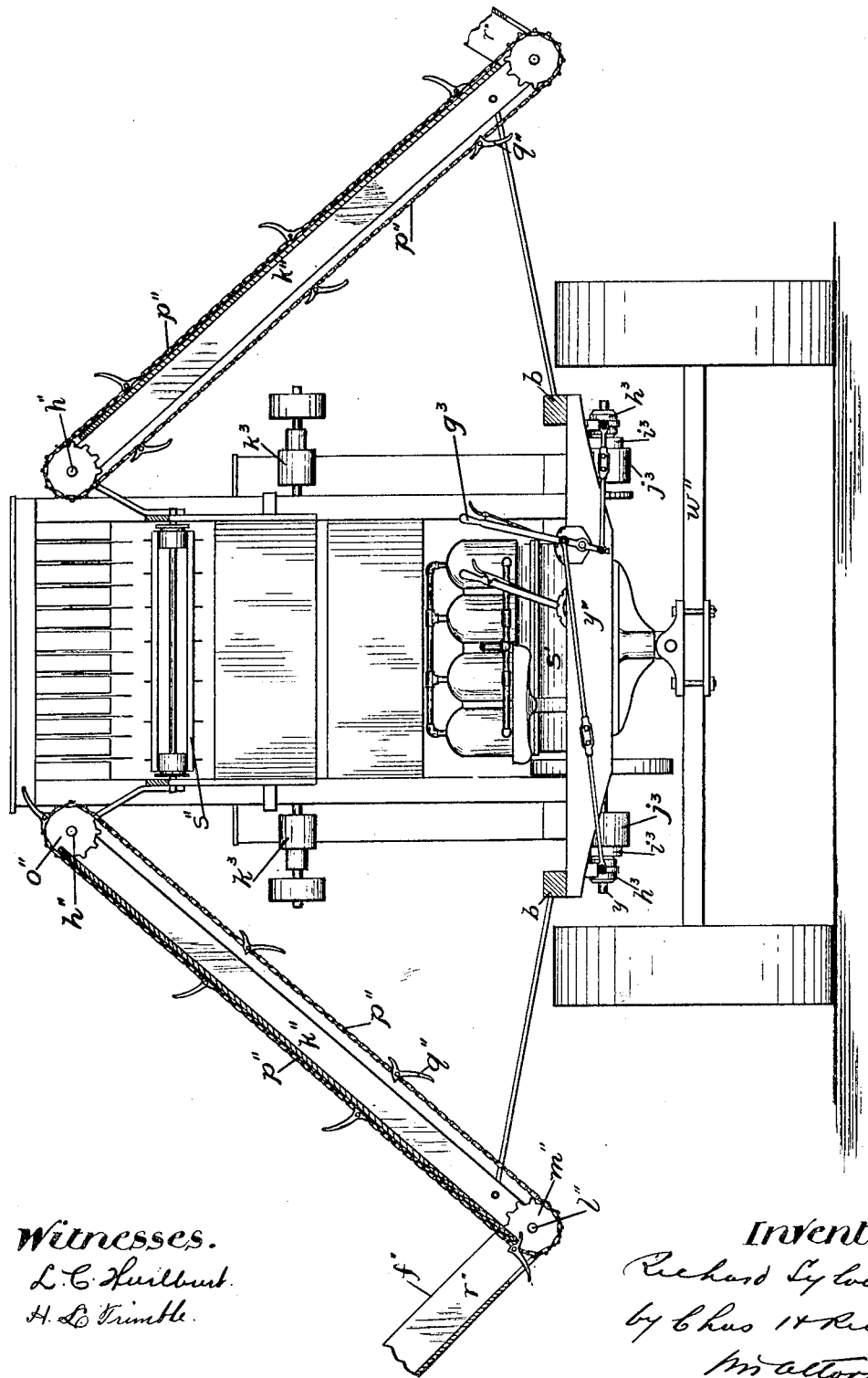

Figure 1 is an elevation of one side of the motor-driven threshing-machine, showing the relative position of the various parts. Fig. 2 is a similar view of the same machine looking at it from the opposite side. Fig. 3 is a longitudinal sectional view of a portion of the threshing-machine, showing the location of the motor, the radiator, and the heater and their relative position to the blower or fan. Fig. 4 is a detail view of the power-transmitting gear translating the motion of the motor to the driving-wheels of the threshing-machine.

Like letters of reference refer to like parts throughout the specification and drawings.

The separator $a$, which may be of any preferred type, is mounted upon a motor-truck $b$, having a platform $c$ beneath the feeder of the separator for the accommodation of the operator, the motor-controlling mechanism, and the steering apparatus. Near the rear end of the motor-truck is the axle $d$ for the driving-wheels $e$, the inner faces of the rims of which are provided with annular gear-wheels $f$, and meshing with the annular gear-wheels $f$ are pinion-wheels $g$, mounted upon and revoluble with the pinion-shaft $h$, journaled in bearings connected to the motor-truck, preferably in front of the driving-wheel axle. The pinion-shaft $h$ has a sprocket-wheel $i$, driven from the sprocket-wheel $j$ by a sprocket-chain $m$.

The sprocket-wheel $j$ is driven through intermediate gearing located in the casing $l$ from a shaft $r$, having thereon a sprocket-wheel $w$, driven from the sprocket-wheel $x$ on the motor-shaft $y$ by means of a sprocket-chain z. The casing l contains a suitable clutch by means of which the driving connection above mentioned may be rendered ineffective to transmit motion to the axle d, and the intermediate gearing is of the type known as "variable-speed" gearing, by means of which the speed ratio between the shaft of the motor and the driving-axle d may be varied.

The motor-shaft y is driven by the motor s', mounted upon or suspended from the motor-truck b, preferably in front of the middle of the blower t'. Inclosing the motor s' is a water-jacket u', connected with the water-tank v' by the flow-pipes w' and with the radiator or cooling-coil x' by means of the radiator-pipes y'. The water circulates from the water-tank v' through the flow-pipes w' to the water-jacket u' and then through the radiator-pipes y' to the radiator or cooling-coil x', from which it returns to the water-tank v' through the return-pipe z'. The exhaust from the motor s' passes through the heater a'', which is preferably located below and in contact with the casing b'' of the blower. The radiator or cooling-coil x' is located adjoining the heater a'' and opposite the opening c'' into the blower, and during the revolution of the fan d'' within the blower an air-current is drawn through the opening c'', being partially heated as it passes around the motor and through and over the radiator and still more so as it comes into contact with the heated casing of the blower. This current is driven by the fan through the screens or sieves and through the machine to dry the grain during the threshing or separating process, so that the grain when it leaves the separator will be for all practical purposes in a perfectly dry condition.

The water-tank v' and the gasolene-tank e'' are placed on the top of the separator, so that their fluids will flow by gravity, respectively, into the water-jacket and motor. The motor s' drives the cylinder-shaft $k^3$ through suitable belts, as indicated in Figs. 1 and 2 of the drawings. At one or both sides of the front end of the motor-truck b is the sheaf carrier or basket f'', into which the sheaves are thrown, and to automatically lift these sheaves to the feeder each sheaf-carrier is equipped with an elevator g'', having a jointed shaft h'', driven by an intermeshing gear i'' from the feeder-belt shaft j''. The sides k'' of the elevator g'' are loosely mounted upon the elevator-shaft h'', so that they can be dropped into a vertical position against the sides of the front end of the separator or motor truck or placed in an operative position at any suitable angle thereto, and journaled in the lower or free ends of the sides k'' is the sprocket-wheel shaft l'', upon which is mounted sprocket-wheels m'', alining with corresponding sprocket-wheels o'', mounted upon the elevator-shaft h''. Passing around the sprocket-wheels m'' and o'' are sprocket-chains p'', having pivoted arms q'' to engage the sheaves as they come into position around the sprocket-wheels upon the sprocket-wheel shaft l'' and raise them to the top of the elevator and drop them upon the feeder-belt s''.

The elevator-shaft l'' being driven from the feeder-belt shaft j'' and the feeder-belt shaft j'' being ordinarily driven from the cylinder-shaft $k^3$ by suitable belts, (not shown,) it is possible to regulate the speed of the delivery of the sheaves upon the feeder-belt to correspond with the delivery of the sheaves by the feeder-belt to the cylinder.

By reference to the drawings it will be noticed that the sheaf carrier or basket f'' consists of two outwardly-inclined arms r'', hinged to the free ends of the elevator sides k'' in such a manner that they can be folded against the truck or separator sides when not in use. Connected to the apparatus adjacent to the delivery end of the grain-spout $t^3$ is a platform t'' for an attendant to stand upon while bagging the grain as it is delivered from the separator. The front axle w'' oscillates upon the king-bolt x'', passing through the front bolster y'', bolted or otherwise rigidly fastened to the motor-truck sides contiguous to the front end Journaled in bearings $a^3$ at the front end of the sides b of the motor-truck is a shaft $c^3$, upon which chains or other flexible connecting members $f^3$ are wound, which chains extend to and engage the front axle w''. The shaft $c^3$ is rotated by means of any suitable steering-handle. By means of the steering device above mentioned it will be seen that it is possible to control the direction of movement of the threshing outfit. When threshing from the stack or mow, the clutch in the casing l is moved into its neutral position, so that no motion will be transmitted to the drive-wheels, and so long as the clutch is in that position the drive-wheels of the threshing-machine will remain motionless, while the motor transmits its motion to the cylinder and other driven parts. When threshing in the field and feeding from the shock or ungathered sheaves, the clutch and variable-speed gearing are so adjusted as to throw the low-speed gear into action to cause the rotation of the drive-wheels during the action of the separating mechanism, so that the threshing-machine may advance or retire along the rows of sheaves or shocks and thresh the grain during its advance. When advancing without operating the separating mechanism, the variable-speed gearing is adjusted to bring the high-speed gear-wheels into action, as the full power of the motor can then be employed for turning the drive-wheels of the threshing-machine.

Having thus fully described my invention, what I claim as new, and desire to secure by Letters Patent, is—

1. In a motor-driven threshing-machine, a suitable motor; driving-wheels operated by said motor for propelling said threshing-machine; variable-speed gearing interposed between said motor and said driving-wheels; a clutch also interposed between said motor and said driving-wheels; separating mechanism constituting a part of said threshing-machine; and means for transmitting motion from said motor to said separating mechanism; whereby said separating mechanism may be operated and the machine simultaneously driven forward at varying rates determined by the amount of grain to be threshed.

2. A motor-driven threshing-machine having steering and drive wheels, a separating mechanism, a fan or blower to create an air-current through the separating mechanism, a motor and a radiator suspended in front of the fan or blower to heat the air passing therethrough and means for operatively transmitting motion from the motor to the drive-wheels separating mechanism and fan or blower.

3. A motor-driven threshing-machine having steering and drive wheels, a separating mechanism, a fan or blower to create an air-current through the separating mechanism, a motor suspended in front of and a heater suspended below the fan or blower to heat the air passing therethrough, and means for operatively transmitting motion from the motor to the drive-wheels, separating mechanism and fan or blower.

4. A motor-driven threshing-machine having steering and drive wheels, a separating mechanism, a fan or blower to create an air-current through the separating mechanism, a motor and a radiator suspended in front of and a heater suspended below the fan or blower to heat the air passing therethrough and means for operatively transmitting motion from the motor to the drive-wheels, separating mechanism and fan or blower.

5. A motor-driven threshing-machine having steering and drive wheels, a separating mechanism, a fan or blower therefor to create a current through the separating mechanism, a motor, a radiator, so positioned as to enable its heat units to be absorbed by the air-current created by the fan or blower, in circulation with the water-space of the motor, and means for operatively transmitting motion from the motor to the drive-wheels, separating mechanism and fan or blower.

6. In a motor-driven threshing-machine, separating mechanism comprising a fan or blower, a heater in contact with the casing of said blower, an explosion-motor for operating said threshing-machine, and a conduit for conducting the exhaust-gases from said motor to said heater.

Lindsay, September 28, 1904.

RICHARD SYLVESTER.

In presence of—
A. EDA SYLVESTER,
T. E. SYLVESTER.